United States Patent
Li et al.

(10) Patent No.: US 8,437,788 B2
(45) Date of Patent: May 7, 2013

(54) METHOD AND APPARATUS FOR ALLOCATING RADIO RESOURCES IN WIRELESS COMMUNICATION SYSTEM

(75) Inventors: Hang Li, Beijing (CN); Qihua Huang, Beijing (CN); Guanghan Xu, Beijing (CN); Hui Zhou, Beijing (CN); Hui Fan, Beijing (CN)

(73) Assignee: Beijing Xinwei Telecom Technology Inc., Beijing (CN)

( * ) Notice: Subject to any disclaimer, the term of this patent is extended or adjusted under 35 U.S.C. 154(b) by 506 days.

(21) Appl. No.: 12/682,528

(22) PCT Filed: Oct. 9, 2008

(86) PCT No.: PCT/CN2008/072624
§ 371 (c)(1),
(2), (4) Date: Apr. 9, 2010

(87) PCT Pub. No.: WO2009/049535
PCT Pub. Date: Apr. 23, 2009

(65) Prior Publication Data
US 2010/0311452 A1    Dec. 9, 2010

(30) Foreign Application Priority Data
Oct. 10, 2007   (CN) .......................... 2007 1 0175702

(51) Int. Cl.
*H04B 7/00* (2006.01)
*H04W 72/00* (2009.01)

(52) U.S. Cl.
USPC ......... 455/509; 455/450; 455/452.1; 455/513

(58) Field of Classification Search ............... 455/450, 455/451, 452.1, 452.2, 453, 454
See application file for complete search history.

(56) References Cited

U.S. PATENT DOCUMENTS

| | | | |
|---|---|---|---|
| 7,209,711 B2 * | 4/2007 | Terry et al. | 455/67.11 |
| 7,924,809 B2 * | 4/2011 | Yin et al. | 370/351 |
| 8,233,939 B2 * | 7/2012 | Li et al. | 455/561 |
| 2004/0185862 A1 * | 9/2004 | Terry et al. | 455/450 |
| 2007/0230397 A1 * | 10/2007 | Sakata | 370/329 |
| 2010/0015923 A1 * | 1/2010 | Golitschek | 455/67.7 |
| 2011/0275399 A1 * | 11/2011 | Englund et al. | 455/513 |
| 2012/0033625 A1 * | 2/2012 | Nagata et al. | 370/329 |
| 2012/0039267 A1 * | 2/2012 | Nagata et al. | 370/329 |

FOREIGN PATENT DOCUMENTS

CN   1998258 A   7/2007

OTHER PUBLICATIONS

International Search Report from P.R. China in International Application No. PCT/CN2008/072624 mailed Jan. 22, 2009.

* cited by examiner

*Primary Examiner* — Tilahun B Gesesse
(74) *Attorney, Agent, or Firm* — Finnegan, Henderson, Farabow, Garrett & Dunner LLP

(57) ABSTRACT

Disclosed are method and apparatus for allocating radio resources. The method for allocating radio resource includes: determining, by a base station, a group of downlink sub-channels and transmission parameters related to the group of downlink sub-channels according to downlink channel characteristics and downlink interference characteristics of each resource block and a downlink bandwidth requirement of a terminal reported by the terminal, and transmitting the group of downlink sub-channels and the related transmission parameters determined to the terminal. The method and apparatus are able to allocate radio resources and determine transmission parameters based on user service requirement and system channel conditions, which greatly optimizes the system performances and improves efficiency.

19 Claims, 9 Drawing Sheets

METHOD AND APPARATUS FOR ALLOCATING RADIO RESOURCES IN WIRELESS COMMUNICATION SYSTEM

This application is a U.S. national stage filing under 35 U.S.C. §371 of International Application No. PCT/CN2008/072624, filed on Oct. 9, 2008, which claims priority to Chinese Patent Application No. CN 200710175702.3, filed on Oct. 10, 2007, the entire contents of all of which are incorporated herein by reference.

FIELD OF THE INVENTION

The present invention relates to wireless communication techniques, and particularly, to method and apparatus for allocating radio resources in a wireless communication system.

BACKGROUND OF THE INVENTION

In wireless communication systems, dynamic allocation of radio resources for each user according to a time-varying service requirement of each user plays an important role for improving the performance and efficiency of the wireless communication systems. Radio resources mainly include sub-channels and transmission power. For each burst transmission, each sub-channel is associated with a specific modulation/coding scheme (MCS). An instantaneous data rate is determined collectively by the number of sub-channels allocated and the modulation/coding scheme adopted by each sub-channel. Due to the time-varying characteristics of wireless channels, the resource allocation should consider not only the bandwidth need of the traffic, but also channel characteristics over time. In addition, since the total transmission power and all the sub-channels of a base station are shared by multiple users, the number of sub-channels occupied by each accessed user, the modulation order and the coding rate adopted for each sub-channel should be adjusted dynamically according to global information of the wireless communication system, so as to optimize the total throughput of the wireless communication system.

SUMMARY OF THE INVENTION

Embodiments of the present invention provide methods and apparatuses for allocating radio resources in a wireless communication system, so as to implement dynamic allocation of radio resources to optimize total throughput of the wireless communication system.

According to an embodiment of the present invention, a method for allocating downlink radio resources is provided. The method includes: determining, by a base station, a group of downlink sub-channels and transmission parameters related to the group of downlink sub-channels for a terminal based on resource block (RB) dependent downlink channel characteristics and downlink interference characteristics and a downlink bandwidth requirement of a terminal reported by the terminal, and transmitting the group of downlink sub-channels and the transmission parameters determined to the terminal.

According to another embodiment of the present invention, a method for allocating uplink radio resources is provided. The method includes: determining, by a base station, a group of uplink sub-channels and transmission parameters related to the group of uplink sub-channels for a terminal based on uplink transmission characteristics, an uplink bandwidth requirement reported by the terminal and uplink RB dependent channel characteristics, and transmitting the group of uplink sub-channels and the related transmission parameters to the terminal.

According to still another embodiment of the present invention, a base station and a terminal for implementing the downlink radio resource allocation are provided.

The base station includes: a base station receiver, adapted to receive RB dependent downlink channel characteristics and downlink interference characteristics reported by a terminal; a downlink radio resource allocation unit, adapted to determine a group of downlink sub-channels and transmission parameters related to the group of downlink sub-channels for the terminal based on the RB dependent downlink channel characteristics, the downlink interference characteristics reported by the terminal and a downlink bandwidth requirement of the terminal; and a base station transmitter, adapted to transmit the group of downlink sub-channels and the related transmission parameters determined to the terminal.

The terminal includes: a downlink measurement unit, adapted to receive signals in at least one downlink sub-channels, and detect RB dependent downlink channel characteristics and downlink interference characteristics based on the signals received; a terminal transmitter, adapted to transmit the RB dependent downlink channel characteristics and the downlink interference characteristics detected to a base station; and a terminal receiving unit, adapted to receive from the base station a group of downlink sub-channels and transmission parameters related to the group of downlink sub-channels determined by the base station.

According to yet another embodiment of the present invention, a base station and a terminal for implementing the uplink radio resource allocation are provided.

The base station includes: a base station receiver, adapted to receive uplink transmission characteristics and an uplink bandwidth requirement reported by a terminal; an uplink radio resource allocation unit, adapted to determine a group of uplink sub-channels and transmission parameters related to the group of uplink sub-channels for the terminal based on the uplink transmission characteristics, the uplink bandwidth requirement reported by the terminal and the RB dependent uplink channel characteristics; and a base station transmitter, adapted to transmit the group of uplink sub-channels and the related transmission parameters determined to the terminal.

The terminal includes: a terminal transmitter, adapted to transmit uplink transmission characteristics and an uplink bandwidth requirement to a base station; a terminal receiving unit, adapted to receive from the base station a group of uplink sub-channels and transmission parameters related to the group of uplink sub-channels determined by the base station.

The above methods and apparatuses are able to allocate radio resources according to user service requirements and system channel conditions. Therefore, under the premise of increasing system total throughput, dynamic allocation of radio resources can be implemented, and therefore the system performance and efficiency can be improved remarkably.

BRIEF DESCRIPTION OF THE DRAWINGS

Embodiments of the present invention will be described hereinafter with reference to the accompanying drawings.

DETAILED DESCRIPTION OF THE INVENTION

The allocation of radio resources concerned in the embodiments of the present invention is basically a problem of optimizing radio resource allocation in a wireless network. Herein, the objective of the radio resource allocation is to dynamically allocate radio resources to terminals which simultaneously access the network, so as to satisfy the service requirement of each terminal while optimizing the system throughput.

Figure 1:
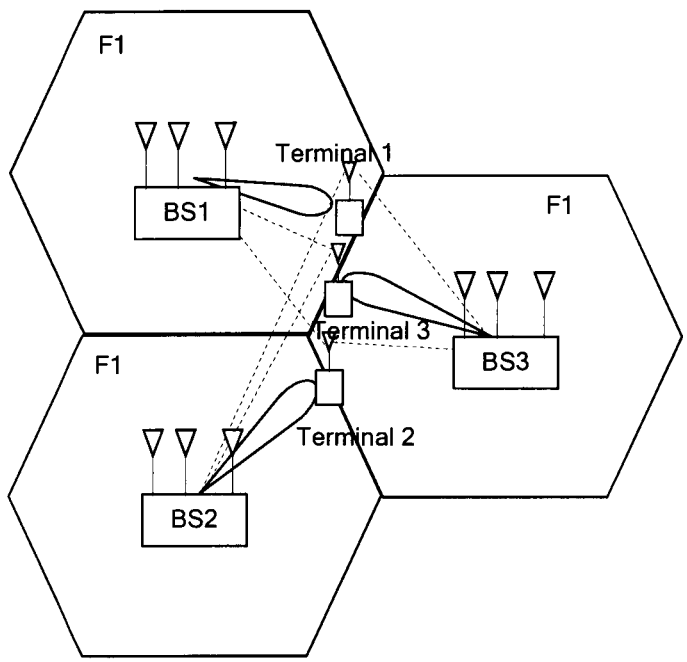
FIG. 1 shows a topology structure of three adjacent base stations which are working on the same frequency.

In a cellular network consisting of multiple base stations (also referred to as BTS) and multiple terminals, each terminal may select a base station for communication. The selected base station is generally the one which has the smallest path loss to the terminal, or the one which has the smallest load among those within reach. In order to improve the spectrum efficiency, it is preferable to make adjacent base stations to work on the same frequency. FIG. 1 is a schematic illustrating interference between three bases stations which are working on the same frequency. FIG. 1 also shows a topology structure of the three adjacent base stations. It can be seen from FIG. 1 that, if the three base stations allocate to three terminals sub-channels which at least partially overlap each other, there will be inter-cell interferences in downlink and uplink communications, as denoted by dotted lines in FIG. 1. The inter-cell interferences may dramatically reduce the throughput of the system, which counteracts the spectrum efficiency obtained by arranging the same frequency for the adjacent base stations. In addition, interferences may also come from outside of the network, e.g., radar, broadcast transmitter, etc. If an allocated sub-channel has similar time-frequency characteristics with such interferences, the interferences will be strong enough to block communications in that sub-channel.

To solve the above problem, an embodiment of the present invention provides a method for allocating radio resources in a wireless communication system. The wireless communication system referred to in embodiments of the present invention includes at least one base station and multiple terminals. The radio resources of the wireless communication system are divided into multiple resource blocks (RBs), wherein each RB consists of one or more sub-channels. Since a base station in the wireless communication system has overall radio resource information such as bandwidth requirements of all terminals, transmission power and available sub-channels, the allocation of sub-channels for all terminals will be implemented in the base station. Furthermore, the method for allocating radio resources in the wireless communication system provided by embodiments of the present invention includes a method for allocating downlink radio resources and a method for allocating uplink radio resources.

Figure 2:
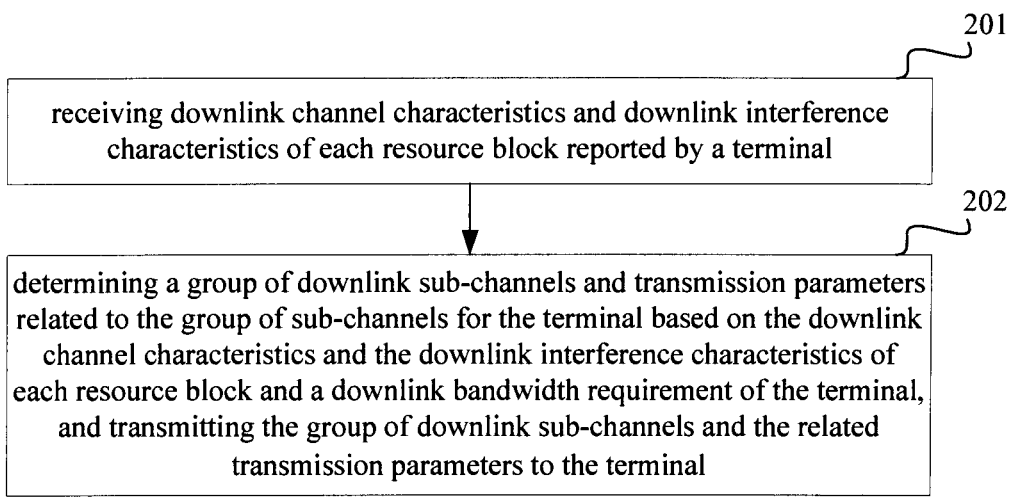
FIG. 2 is a flowchart illustrating a method for allocating downlink radio resources according to an embodiment of the present invention.

The method for allocating downlink radio resources is shown in FIG. 2, including the following steps.

In step 201, a base station receives RB dependent downlink channel characteristics and downlink interference characteristics submitted from a terminal.

In this step, the terminal may firstly receive signals from one or more downlink sub-channels, and detect the RB dependent downlink channel characteristics and the downlink interference characteristics based on the signals received.

In an embodiment of the present invention, the downlink channel characteristics include at least a signal quality fluctuation margin (SQFM). The SQFM is calculated by the terminal based on signals in a common channel when the terminal is in an idle state or based on signals on a dedicated channel of the terminal when the terminal is in a communication state.

The downlink interference characteristics may include a downlink average interference level which can be obtained by calculating an average value of interference powers of all downlink sub-channels in one resource block or by calculating an average value of interference powers of downlink sub-channels allocated to the terminal in one resource block.

In order to detect the interference powers of all the downlink sub-channels, it is possible to configure at least one null symbol in each downlink sub-channel as an interference observation window (IOW). The base station does not transmit information on these null symbols. Thus, the terminal is able to obtain the interference power in a sub-channel by detecting the signal in the IOW of each downlink sub-channel. It should be noted that, since the base station does not transmit information on these null symbols, in order to measure the interference power accurately, the IOW locations of adjacent base stations in the same downlink sub-channel should not overlap each other.

In step 202, the base station determines for the terminal a group of downlink sub-channels and transmission parameters related to the group of sub-channels according to the RB dependent downlink channel characteristics, the downlink interference characteristics and a downlink bandwidth requirement of the terminal, and transmits the group of downlink sub-channels and transmission parameters related to the group of sub-channels to the terminal.

The above transmission parameters may include at least a modulation/coding scheme. Usually, the modulation/coding scheme includes a modulation/coding type and a coding rate.

In the above step 202, the method for determining the group of downlink sub-channels and related transmission parameters by the base station may include steps as follows.

In step 2021, for each modulation/coding scheme, a group of available downlink sub-channels is selected from at least one downlink RB until the downlink bandwidth requirement is satisfied or all available sub-channels are used up, and a transmission power required by each downlink sub-channel in each RB is calculated.

It should be noted that, in this step, it is preferable to select downlink sub-channels in the resource block with higher availability metric. The availability metric refers to a radio of an available transmission power for the resource block to a product of an average interference power of the resource block and a transmission power required by a single sub-channel of the resource block.

In step 2022, a modulation/coding scheme and a corresponding group of downlink sub-channels are determined for the terminal based on the downlink bandwidth requirement of the terminal and a state of system resources.

In an embodiment of the present invention, the above state of system resources may include at least two states: a power shortage state and a sub-channel shortage state. The power shortage state means that the remaining downlink transmission power is not enough for supporting remaining downlink sub-channels. And the sub-channel shortage state means that the remaining downlink transmission power is able to support far more downlink sub-channels than the remaining downlink sub-channels.

In the above step 2021, as for initial radio resource allocation after a random access, the transmission power required by each sub-channel in each RB may be calculated based on RB dependent downlink channel characteristics (e.g. the downlink SQFM) and downlink interference characteristics (e.g. the downlink average interference level). As for radio resource allocation during communication, the transmission power required by each sub-channel in each resource block may be calculated based on downlink transmission power with downlink power control and a difference between a downlink signal receiving quality index and an expected receiving quality.

The method for allocating downlink radio resources provided by an embodiment of the present invention will be described in detail hereinafter by taking an Orthogonal Frequency Division Multiple Access (OFDMA)-Time Division Multiple Access (TDMA) Time Division Duplex (TDD) wireless communication system an example. It should be noted that other wireless communication systems are also applicable, e.g. Code Division Multiple Access (CDMA)-Time Division Multiple Access (TDMA) wireless communication system.

Figure 3:
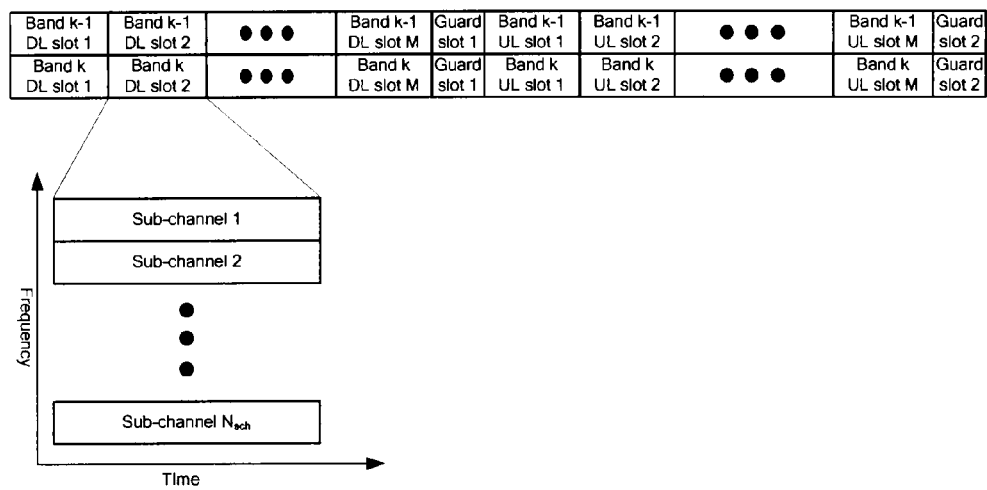
FIG. 3 is a schematic illustrating a frame structure of a transmission frame in an OFDMA-TDD system.

FIG. 3 shows a frame structure of a transmission frame in an OFDMA-TDMA TDD system. In the OFDMA-TDMA TDD system, radio resources are described as a two-dimensional plane, including time and frequency grids, also called time-frequency grids. Each time-frequency grid denotes a sub-carrier in a defined time interval, and occupies one sub-carrier and one symbol period. In the OFDMA-TDMA TDD system, a symbol to be transmitted is modulated into a time-frequency grid for transmission. In the frequency domain, all available spectrum resources in the OFDMA-TDMA TDD system are divided into N frequency bands, also referred to as bands. Each frequency band includes K sub-carriers, where $N \geq 1$ and $K > 1$. In the time domain, uplink signals and downlinks signals are transmitted alternately in uplink frames and downlink frames. Each uplink frame or downlink frame is further divided into multiple time slots. Each time slot includes one or more symbol periods. A first guard slot is configured between an uplink frame and a subsequent downlink frame, and a second guard slot is configured between a downlink frame and a subsequent uplink frame. In the OFDMA-TDMA TDD system, a group of uplink time-frequency grids and a group of downlink time-frequency grids will be allocated to each communicating user for interaction with a base station. In practical applications, all the time-frequency grids in the OFDMA-TDMA TDD system can be divided into at least one time-frequency grid set in advance with each time-frequency set being defined as a sub-channel. The dividing process should ensure that all time-frequency grids arranged into one sub-channel are in the same band. Generally, the manner of dividing a frequency band into sub-channels is the same in all base stations in the OFDMA-TDMA TDD system. Further, at least one sub-channel can also be combined to form a resource block. In other words, in this embodiment, each RB includes multiple sub-carriers and multiple symbol periods, and each sub-channel includes multiple sub-carriers and multiple symbol periods which are in the same RB with the multiple sub-carriers.

Figure 4:
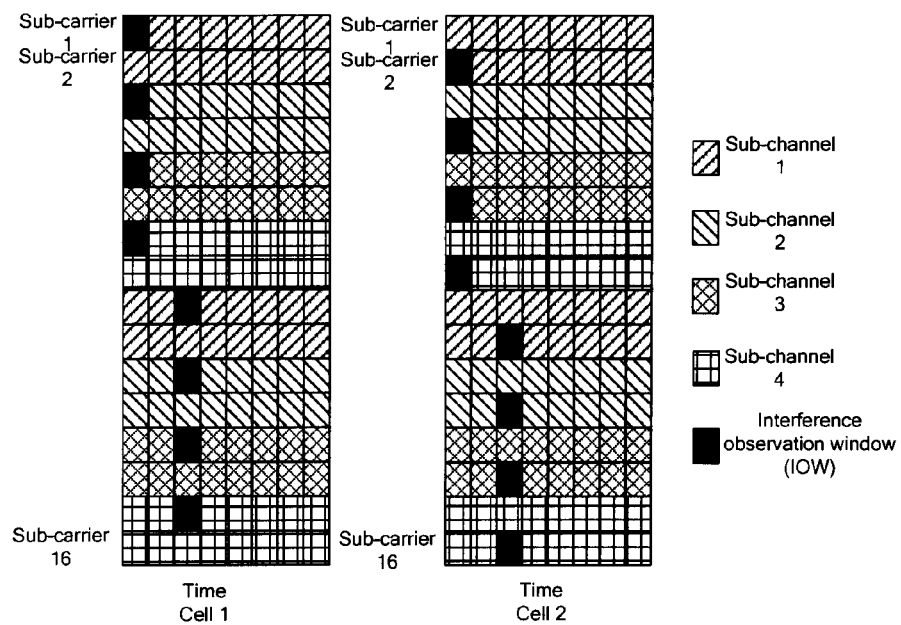
FIG. 4 is a schematic illustrating sub-channel partition inside a frequency band and IOW assignment inside sub-channel of two adjacent cells in an OFDMA-TDMA TDD system.

In this embodiment, the OFDMA-TDMA TDD system does not transmit information in one or more time-frequency grids. Such time-frequency grid is referred to as an IOW, and only interferences and thermal noises can be observed in the IOW. As described above, the manner for dividing a frequency band into sub-channels is the same in all cells. However, in order to observe inter-cell interferences, the location of an IOW in each sub-channel is determined by each cell. Specifically, it can be defined that: if the m'th cell and the n'th cell are adjacent cells, the location of the IOW in the i'th sub-channel of the m'th cell is different from the location of the IOW in the i'th sub-channel of the n'th cell. FIG. 4 shows a manner of sub-channel partition inside a frequency band and IOW assignment in each sub-channel in two adjacent cells in the OFDMA-TDMA TDD system. As shown in FIG. 4, 16 sub-carriers in each frequency band are partitioned into 4 sub-channels. And in each sub-channel, 2 IOWs are defined. The same partition manner is adopted by the two cells, but the locations of the IOW in the same sub-channels of the two cells are different. Thus, one cell is allowed to observe interferences from another cell.

The method for allocating downlink radio resources in an OFDMA-TDMA TDD system provided by the embodiment of the present invention includes a method for allocating downlink radio resources during a random access procedure and a method for allocating downlink radio resources during a normal communication procedure.

Figure 5:
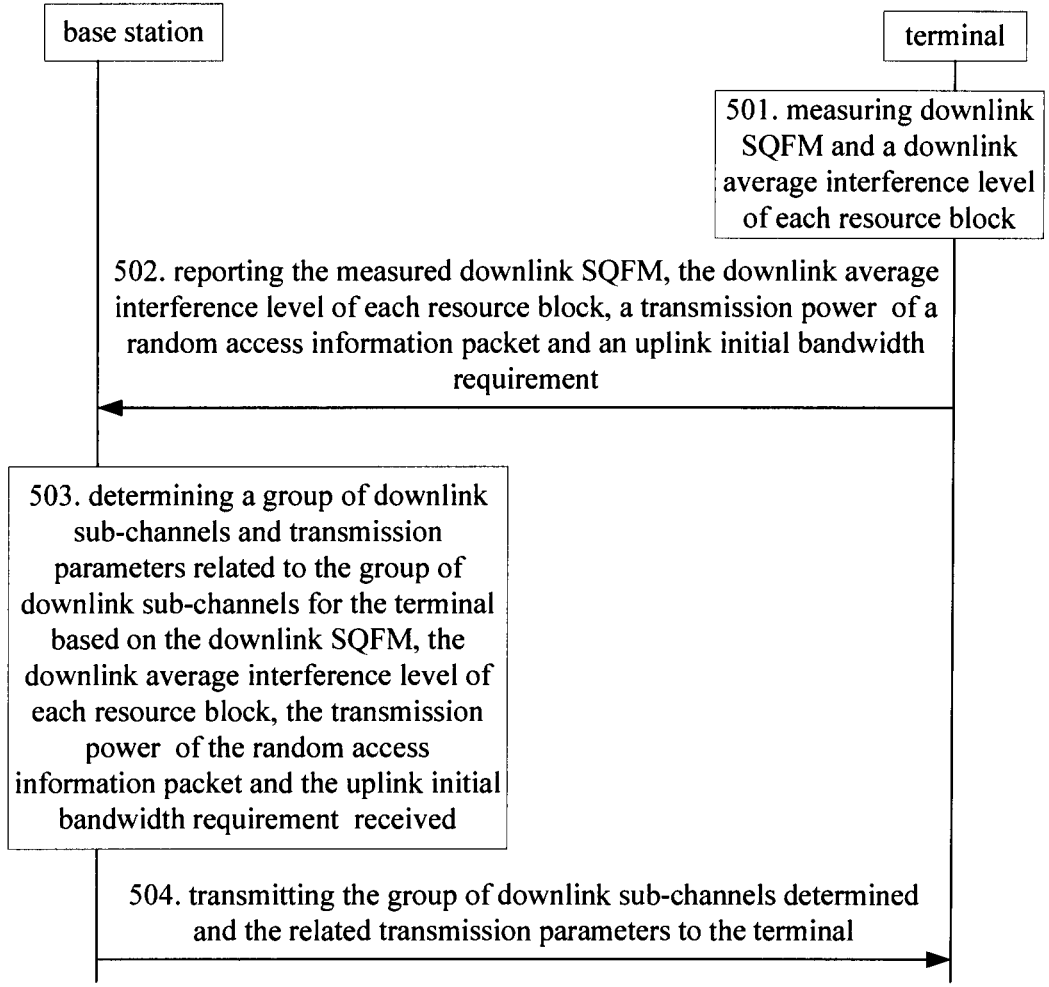
FIG. 5 is a flowchart illustrating a process for allocating downlink radio resources during a random access procedure of a terminal in an OFDMA-TDMA TDD system according to an embodiment of the present invention.

FIG. 5 is a flowchart illustrating a process for allocating downlink radio resources during a random access procedure of a terminal in an OFDMA-TDMA TDD system according to an embodiment of the present invention. In this embodiment, the downlink channel characteristics include a downlink SQFM. The downlink interference characteristics include a RB dependent downlink average interference level. The uplink transmission characteristics include a transmission power of a random access information packet. And an uplink bandwidth requirement is an initial uplink bandwidth requirement.

As shown in FIG. 5, the method for allocating downlink radio resources during a random access procedure of a terminal mainly includes steps as follows.

In step 501, the terminal measures a downlink SQFM and a RB dependent downlink average interference level.

In order to implement the above step 501, after receiving signals from a downlink wireless channel, a receiver of the terminal performs a fast Fourier transform on the signals received, and performs signal extraction and signal detection on the downlink sub-channel allocated to the terminal. Signals in the IOW are part of the signals to be extracted. Symbols obtained through signal detection are further used for decoding a message. The signals extracted and the symbols detected will be used for calculating the downlink SQFM and the RB dependent downlink average interference level.

1) Measurement of the Downlink SQFM:

In this embodiment, the signals extracted and the symbols detected will be firstly used for calculating a Signal to Noise Radio (SNR) of each downlink sub-channel. The SNR reflects instantaneous signal characteristics. The calculation is based on the following formula (1):

$$SNR_{ul} = \frac{P}{\sum_{i=1}^{P} |\tilde{S}_i - \hat{S}_i|^2} \quad (1)$$

wherein P denotes the number of symbols, $\tilde{S}_i$ denotes the symbols detected, $\hat{S}_i$ denotes the symbols transmitted. Both $\tilde{S}_i$ and $\hat{S}_i$ are assumed to be normalized to 1.

Besides the SNR of each downlink sub-channel which reflects instantaneous signal characteristics, the terminal may also calculate the fluctuation of channel conditions over time. A preferable fluctuation metric for measuring the fluctuation of channel conditions over time is the SQFM which reflects the range of variation of signal quality. Therefore, the terminal may also calculate the downlink SQFM, denoted as SQFMdl. As well known, the variation of signal quality may be caused by either channel gain fluctuation or interference level fluctuation. In this embodiment, the SQFMdl can be calculated based on a received preamble strength collected over continuous sub-frames. In addition, the SQFMdl may also be calculated based on SNR of a broadcast channel collected over continuous frames.

2) Measurement of Downlink Average Interference Level:

Suppose for each downlink sub-channel, $d_{iow}$ IOWs are configured. Then the instantaneous interference level of the k'th downlink sub-channel $CI_{dl}(k, t)$ can be calculated based on interference levels from all IOWs received of the k'th downlink sub-channel:

$$CI_{dl}(k, t) = \sum_{i=1}^{d_{iow}} |I_{dl}(k, t, i)|^2 \quad (2)$$

wherein $d_{iow}$ denotes the number of IOWs in each downlink sub-channel, $I_{dl}(k,t,i)$ denotes the complex amplitude of an interference level detected in the i'th IOW of the t'th frame in the k'th downlink sub-channel.

In this embodiment, the average interference level of the k'th downlink sub-channel can be calculated through filtering instantaneous interference levels over continuous frames, i.e. calculating according to the following formula (3), such that computation error due to finite data effect is minimized.

$$ACI_{dl}(k, t) = \frac{1}{T_d} \sum_{\tau=0}^{T_d} |CI_{dl}(k, t - \tau)|^2 \quad (3)$$

wherein $T_d$ denotes the length of data needs to be stored for calculating the average interference level.

If the terminal is in an idle state and prepares to initiate a random access, the terminal may measure the interference levels for all assignable downlink sub-channels. The measured result reflects distribution of the downlink interferences across available sub-channels. The terminal reports the measured result to the base station via a random access information packet in the random access procedure. Due to the limited bandwidth of the random access message packet, interference levels of all the assignable downlink sub-channels may be encoded into shortened message such that it can be embedded into the random access message.

In an embodiment of the present invention, the available spectrum of the whole time-frequency grids are divided into resource blocks (RB). Each resource block includes at least one sub-channel, occupies at least one slot and at least one sub-carrier. Therefore, the RB dependent downlink average interference level may be taken as the downlink interference characteristics. The RB dependent downlink average interference level refers to an average of the interference levels of multiple sub-channels belonging to the same RB. The calculation may include the steps as follows.

An instantaneous interference level $BI_{dl}(j,t)$ is calculated for the j'th frequency band and the t'th frame according to the following formula (4):

$$BI_{dl}(j, t) = \frac{1}{N_{sch}} \sum_{k=1}^{N_{sch}} |CI_{dl}(k, t)|^2 \quad (4)$$

wherein $N_{sch}$ denotes the number of sub-channels in the j'th frequency band.

The $BI_{dl}(j,t)$ can be further averaged over time to obtain the average interference level of the j'th frequency band up to the t'th frame based on the following formula (5):

$$ABI_{dl}(j, t) = \frac{1}{T_d} \sum_{\tau=0}^{T_d} |BI_{dl}(j, t - \tau)|^2 \quad (5)$$

In step 502, the terminal reports the measured downlink SQFM, the RB dependent downlink average interference level, a transmission power $P_{tx}$ of the random access information packet and an uplink initial bandwidth requirement $BW_{req\_up}$ to the base station via the random access information packet.

Besides the SQFMdl and the RB dependent downlink average interference level, the random access information packet may also include the transmission power $P_{tx}$ of the random access information packet to fulfill the downlink initial channel allocation.

In step 503, the base station determines a group of downlink sub-channels and related transmission parameters for the terminal based on the downlink SQFM, the RB dependent downlink average interference level, the transmission power $P_{tx}$ of the random access information packet and the uplink initial bandwidth requirement $BW_{req\_up}$ received.

In step 504, the base station transmits the group of downlink sub-channels determined and the related transmission parameters to the terminal.

In this embodiment, the base station may calculate a path loss according to the transmission power of the random access information packet and signals received. Therefore, the above step 503 may include steps as follows.

In step 5031, $BDPPC_{dl}(j,t)$, the transmission power required by each downlink sub-channel of the resource block for supporting a minimum modulation/coding scheme, can be calculated based on an interference value $CI_{access}$ observed in the random access sub-channel, the downlink SQFMdl in the random access information packet, the RB dependent downlink average interference level $ABI_{dl}(j,t)$ and the transmission power $P_{tx}$ of the random access information packet.

When calculating the $BDPPC_{dl}(j,t)$, the following factors are taken into consideration, e.g., the interference $CI_{access}$ of the random access sub-channel, the signal quality fluctuation SQFMdl and the downlink average interference level $ABI_{dl}(j,t)$ for the k'th resource block, etc. Based on the $BDPPC_{dl}(j,t)$, transmission powers of various modulation/coding schemes can be obtained.

In this step, the base station firstly calculates the SNR of the random access information packet received, extracts the SQFMdl, $P_{tx}$ and $ABI_{dl}(j,t)$ from the content of the random access information packet, and finally calculates the $BDPPC_{dl}(j,t)$ according to the following formula (6):

$$BDPPC_{dl}(j,t)=SNR_{th}-P_{tx}-SNR-CI_{access}+ABI_{dl}(j,t)+SQFM_{dl} \quad (6)$$

wherein the $SNR_{th}$ denotes an SNR threshold required for minimum modulation/coding scheme.

In step 5032, since the random access information packet further carries the uplink initial bandwidth requirement $BW_{req\_up}$, the base station may calculate a downlink initial bandwidth requirement based on the uplink initial bandwidth requirement and downlink packet arrivals destined to an accessing user.

In step 5033, the base station determines a group of downlink sub-channels and related transmission parameters based on the downlink initial bandwidth requirement, the system resource state and the transmission power $BDPPC_{dl}(j,t)$ required by each downlink sub-channel in the resource block for supporting the minimum modulation/coding scheme.

In this embodiment, the base station may maintain a resource table (RT) which records availability of resources. The resources include total downlink available power $P_{avail\_dl}(j,t)$ and downlink/uplink sub-channel allocation for each user. With information maintained in the RT, the base station is able to locate available downlink sub-channels and calculate a modulation/coding scheme to be adopted for the resource allocation.

Figure 6:
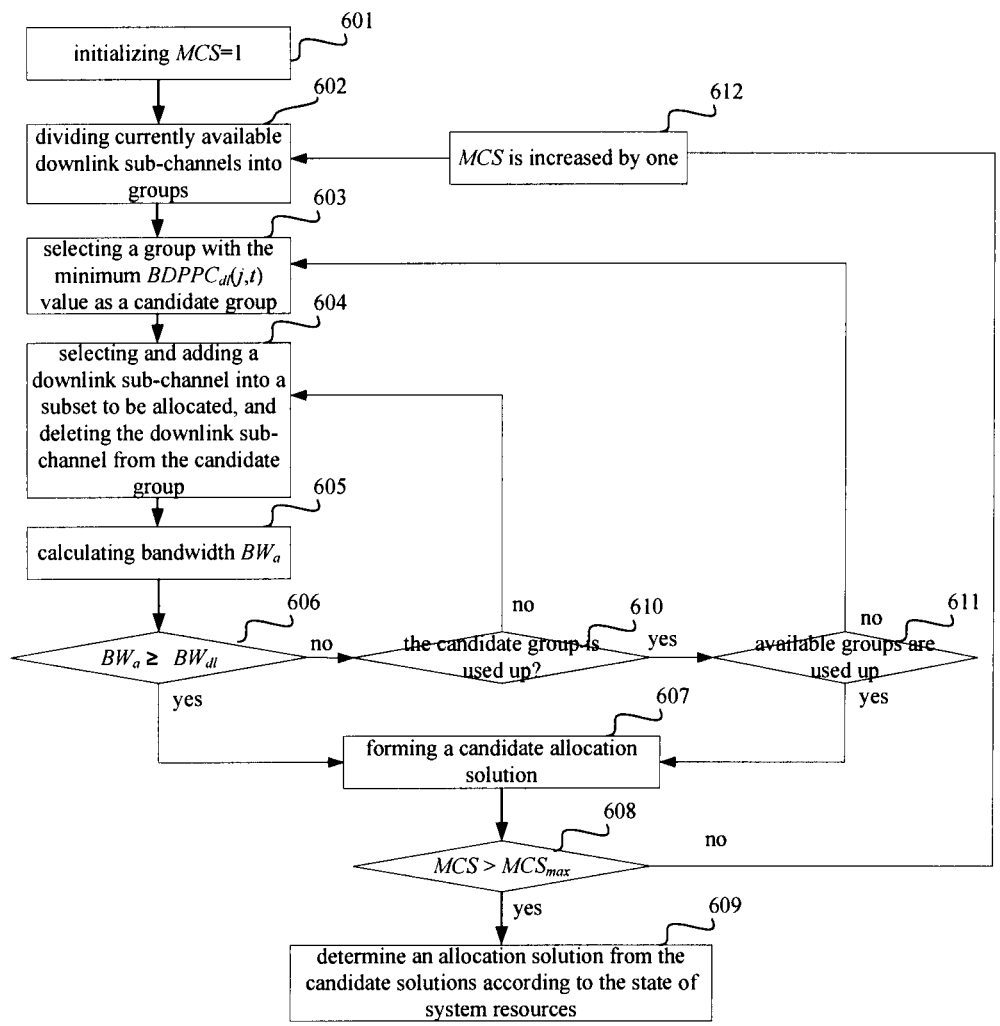
FIG. 6 is a flowchart illustrating a method for determining a group of downlink sub-channels and related transmission parameters according to an embodiment of the present invention.

In particular, during the initial allocation of downlink radio resources, a subset will be selected from a set of currently available downlink sub-channels according to the relative interference strength of the downlink sub-channels and downlink available power. Specifically, the currently available downlink sub-channels are grouped such that sub-channels in the same group belong to the same RB. When selecting a subset from the downlink available sub-channels, it is preferably to select sub-channels with smaller interferences in the same group. That is, for each modulation/coding scheme, the selection of downlink sub-channels based on the $BDPPC_{dl}(j,t)$ and the $P_{avail\_dl}(j,t)$ is performed. Each selection procedure includes multiple iterative processes with one iteration generating one sub-channel. In each iterative process, if at least one of the following two conditions is met, the iterative process should terminate and the selected sub-channels will be outputted: (1) the downlink bandwidth requirement is met; (2) all the sub-channels have been selected or $P_{avail\_dl}(j,t)=0$ and the downlink bandwidth requirement is not met. The detailed selection process is shown in FIG. 6, which mainly includes the steps as follows.

In step 601, a modulation/coding scheme identifier MCS is set for identifying each modulation/coding scheme, and the initial value of the MCS is set to be 1.

In step 602, currently available downlink sub-channels are divided into groups to obtain at least one available group where downlink sub-channels in the same available group belong to the same RB.

In step 603, a group with the minimum $BDPPC_{dl}(j,t)$ is select to be a candidate group from all the available groups of downlink sub-channels.

In step 604, a downlink sub-channel is selected from the candidate group, and the downlink sub-channel selected is added into a subset to be allocated, and the downlink sub-channel selected is deleted from the candidate group.

In step 605, a total bandwidth BWa is calculated according to the current modulation/coding scheme.

In step 606, the BWa is compared with the downlink bandwidth requirement BWdl, if the BWa is larger than or equals the BWdl, step 607 is performed; otherwise, step 610 is performed.

In step 607, a candidate allocation solution is formed for the current modulation/coding scheme, and step 608 is performed.

In step 608, it is determined that whether the MCS is larger than a maximum modulation/coding scheme MCSmax, i.e. determining whether all the modulation/coding schemes have been traversed, if yes, step 609 is performed; otherwise, step 612 is performed.

In step 609, an allocation solution is selected from the candidate allocation solutions based on the state of system resources, and the process is ended.

In step 610, it is determined that whether the candidate groups are used up, if yes, step 611 is performed; otherwise, step 604 is performed.

In step 611, it is determined that whether the available groups are used up, if yes, step 607 is performed, otherwise, step 603 is performed.

In step 612, the MCS is increased by one, and step 602 is performed.

According to the method shown in FIG. 6, the base station calculates a candidate allocation solution for each possible modulation/coding scheme. And after all candidate allocation solutions are calculated, it is determined that which allocation solution will be applied to the current user according to the state of system resources. The state of system resources is a parameter related to the user and it indicates whether the base station is currently in a power limited state or a channel limited state from the view of the user. For the power limited state, a lower MSC level should be applied. For the channel limited state, a higher MCS level should be chosen to satisfy the bandwidth requirement.

The above describes a method for allocating downlink radio resources during a random access of a terminal. Hereinafter, the method for allocating downlink radio resources after the terminal successfully implements the random access and enters a communication state will be described.

In a communication state, data are transmitted in both uplink frames and downlink frames. Changes in uplink and downlink channels may be traced closely using the data received at the terminal and the base station respectively. Therefore, in an embodiment of the present invention, an uplink and downlink close-loop power control mechanisms may be used for tracing the change in channel conditions and for implementing dynamic allocation of the uplink and downlink radio resources. In a close-loop power control process, a receiver may monitor a signal quality indicator (SQI), e.g. SNR at a receiver, and feed the SQI monitored back to a transmitter for adjusting the strength of transmission power, so that the SQI may be stabilized within an acceptable range to meet a pre-defined QoS requirement. The power control mechanism may further take the SQFM measured by the receiver into the calculation. The SQFM may be caused by channel fading or interference or both. With the help of power control, $BDPPC_{dl}(j,t)$ and $BDPPC_{ul}(j,t)$ can be obtained by calculating a moving average of the downlink transmission power and the uplink transmission power respectively, and may be further adjusted according to the SQI.

Figure 7:
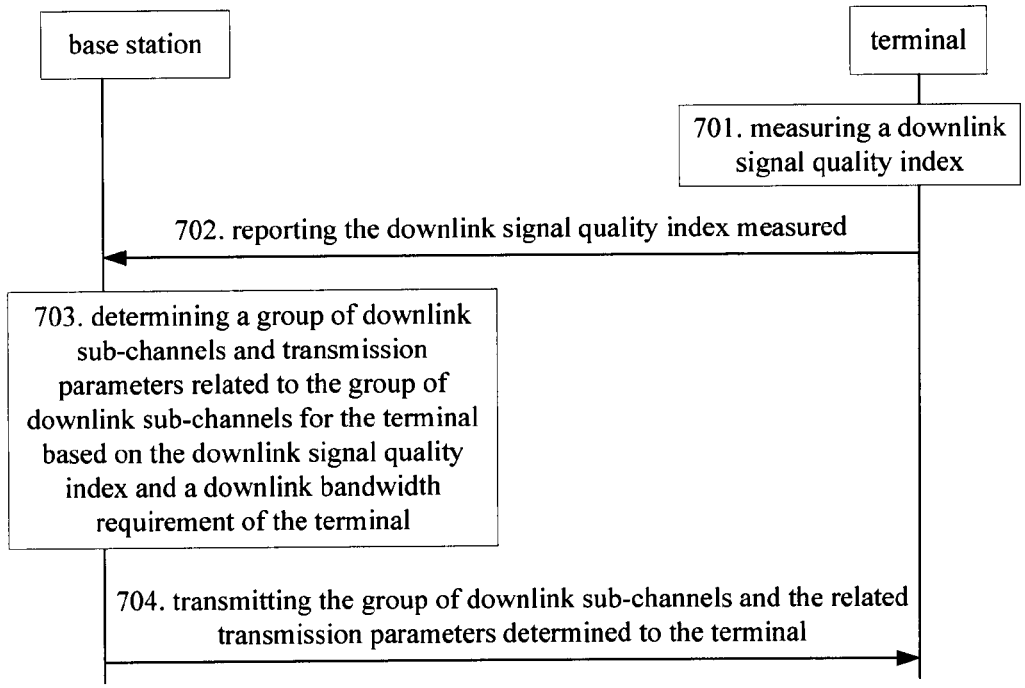
FIG. 7 is a flowchart illustrating a method for allocating downlink radio resources during a communication procedure of a terminal in an OFDMA-TDMA TDD system according to an embodiment of the present invention.

FIG. 7 is a flowchart illustrating a method for allocating downlink radio resources during a communication procedure of a terminal in an OFDMA-TDMA TDD system according to an embodiment of the present invention. In this embodiment, the downlink channel characteristics may include at least a downlink SQI. As shown in FIG. 7, the method includes steps as follows.

In step 701, a terminal measures a downlink SQI.

In this step, the downlink SQI may be a statistic of downlink SNR.

In step 702, the terminal reports the measured downlink SQI to the base station.

In step 703, the base station determines a group of downlink sub-channels and related transmission parameters for the terminal based on the downlink SQI received and a downlink bandwidth requirement of the terminal.

In step 704, the base station transmits the group of downlink sub-channels and the related transmission parameters to the terminal.

In particular, in step 703, the base station may determine the downlink transmission power required to support each modulation/coding scheme according to the method described in step 503. In this case, the terminal further needs to report a downlink average interference level and a downlink SQFM to the base station.

In addition, with the help of the close-loop power control, the base station may directly adjust the downlink transmission power according to the downlink SQI. The detailed method may include: supposing that the downlink transmission power of the t'th frame in the j'th block at a given MCS is set to $BDP_{dl}(j,t)$, normalizing the $BDP_{dl}(j,t)$ to generate $BDNP_{dl}(j,t)$ representing the transmission power for MCS=1. The $BDPPC_{dl}(j,t)$ can be updated according to the following formula (7):

$$BDPPC_{dl}(j,t)=\alpha \cdot BDPPC_{dl}(j,t-1)+(1-\alpha) \cdot BDNP_{dl}(j,t) \quad (7)$$

In order to closely trace channel changes, $BDPPC_{dl}(j,t)$ is updated for each frame. However, in the communication state, the allocation of radio resources is not necessarily performed for every frame. Generally, the allocation of radio resources may be performed every T frames, wherein T>>1. Therefore, the $BDNP_{dl}(j,t)$ may be calibrated respectively according to statistics of the SQIs of downlink and uplink in T frames.

In an embodiment of the present invention, the SNRs of symbols detected in T frames are taken as the statistics of the SQIs, recorded as SNRstats. The value of the SNRstats should make P % of the SNRs larger than the SNRstats, wherein the value of P % can be configured according to experience. That is, for all $j \in [t-T+1,t]$, the following two conditions should be satisfied at the same time:

$$\text{for } j \in S \subseteq [t-T+1,t], SNR(j,t) > SNR_{stats} \quad (1)$$

$$100 \cdot |S|/T = P. \quad (2)$$

Suppose a statistic $SNR_{stats\_dl}$ of the downlink SQI has been obtained, a downlink calibration item can be calculated according to the following formula (8):

$$D_{cal\_dl}=SNR_{th}(MCS)-SNR_{stats\_dl} \quad (8)$$

When allocating radio resources in the t'th frame, the $D_{cal\_dl}$ will be used for updating $BDPPC_{dl}(j,t)$, wherein the $BDPPC_{dl}(j,t)$ is updated according to the following formula (9):

$$BDPPC_{dl}(j,t_*)=BDPPC_{dl}(j,t_*)+D_{cal\_dl} \quad (9)$$

Once the $BDPPC_{dl}(j,t_*)$ is determined, the downlink radio resources can be allocated in the communication state according to the method shown in FIG. 6.

For facilitating the calculation, channel information needs to be reported to the base station from the terminal. For example, the downlink received signal quality $SNR_{stats\_ul}(j, t^*)$, the downlink interference level $ABI_{dl}(j,t)$ and the uplink bandwidth requirement $BW_{req\_up}(j,t^*)$ will be reported to the base station periodically. Once the calculation for new allocation is completed, the new channel allocation and related parameters will be transmitted to the terminal for starting a channel re-allocation procedure. The channels allocation and related parameters may include the locations of the downlink sub-channels allocated and their associated MCS.

Figure 8:
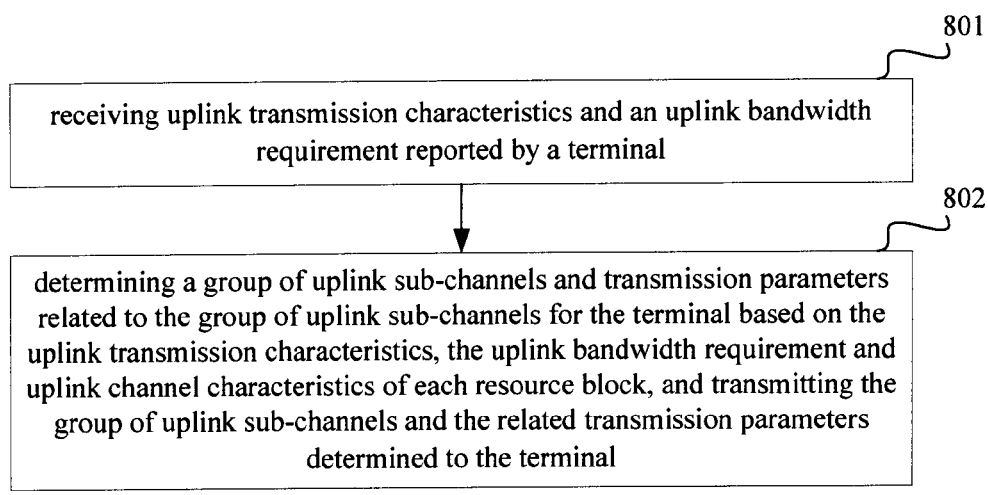
FIG. 8 is a flowchart illustrating a method for allocating uplink radio resources according to an embodiment of the present invention.

Embodiments of the present invention also provide a method for allocating uplink radio resources. The process flow is shown in FIG. 8, which mainly includes the steps as follows.

In step 801, a base station receives uplink transmission characteristics and an uplink bandwidth requirement reported by a terminal.

During a random access procedure of the terminal, the uplink transmission characteristics may include a transmission power for transmitting a random access information packet. And during a communication procedure, the uplink transmission characteristics may include a statistic of transmission power of a dedicated uplink sub-channel in multiple frames up to the current frame, also referred to as a statistic of uplink transmission power based on uplink power control.

During the random access procedure, the uplink bandwidth requirement refers to an uplink initial bandwidth requirement. And in the communication procedure, the uplink bandwidth requirement refers to a current uplink bandwidth requirement.

In step 802, the base station determines a group of uplink sub-channels and transmission parameters related to the group of uplink sub-channels for the terminal based on the uplink transmission characteristics, the uplink bandwidth requirement and RB dependent uplink channel characteristics, and transmits the group of uplink sub-channels determined and the related transmission parameters to the terminal.

In this step, in the random access procedure, the RB dependent uplink channel characteristics include an RB dependent uplink SQFM. And in the communication procedure, the uplink channel characteristics include an RB dependent uplink SQI.

The above transmission parameters include at least a modulation/coding scheme, and generally further include a modulation/coding type and a coding rate.

The step of determining a group of uplink sub-channels and related transmission parameter for the terminal based on the uplink transmission characteristics and the uplink bandwidth requirement may include the steps as follows.

In step 8021, the base station selects a group of available uplink sub-channels for each modulation/coding scheme from one or more uplink resource blocks until the uplink bandwidth requirement is satisfied or all available sub-channels are used up, and calculate a transmission power required by each sub-channel in all the resource blocks.

In this step, it is preferable to select a sub-channel in a resource block with a relatively high availability metric. The availability metric denotes a ratio of an available transmission power of the resource block to a product of an average interference power of the resource block multiplying a transmission power required by a single sub-channel of the resource block.

In step 8022, a modulation/coding scheme and a corresponding group of uplink sub-channels are determined based on the state of system resources.

In the above step 8021, for an initial channel allocation after the random access, the transmission power of each sub-channel in each resource block may be calculated based on the downlink SQFM and the uplink average interference level. And for a channel allocation in the communication state, the transmission power required by each sub-channel in each resource block may be calculated based on the uplink transmission power with uplink power control and a difference between the uplink received signal quality indicator and an expected receiving quality.

Hereinafter, the OFDMA-TDMA TDD wireless communication system is still taken as an example for describing the method for allocating uplink radio resources provided by the embodiments of the present invention in detail.

Figure 9:
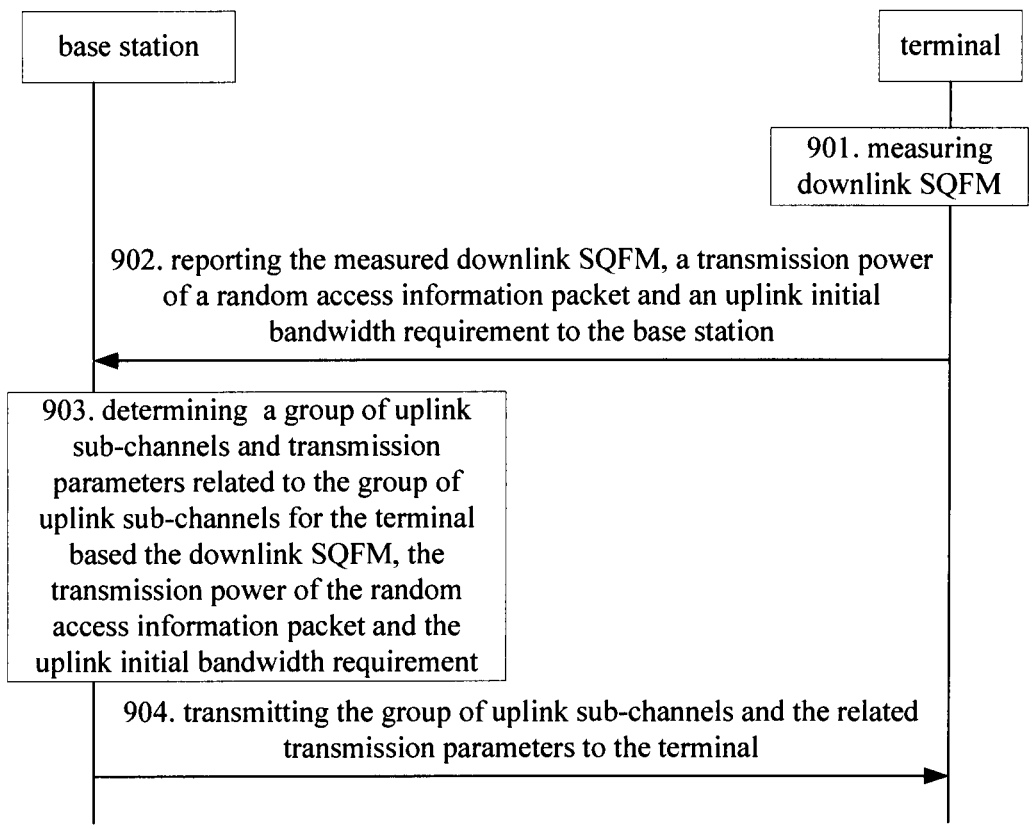
FIG. 9 is a flowchart illustrating a method for allocating uplink radio resources during a random access procedure of a terminal in an OFDMA-TDMA TDD system according to an embodiment of the present invention.

FIG. 9 is a flowchart illustrating a method for allocating uplink radio resources during a random access procedure of a terminal in an OFDMA-TDMA TDD system according to an embodiment of the present invention. In this embodiment, since a base station has not obtained uplink SQFM yet in the initial access procedure of a terminal, the terminal is further required to report the downlink SQFM to the base station as uplink channel characteristics. The uplink transmission characteristics may include transmission power of a random access information packet. The uplink bandwidth requirement is the uplink initial bandwidth requirement. As shown in FIG. 9, the method may mainly include steps as follows.

In step 901, a terminal measures downlink SQFM.

In this step, the method for measuring the downlink SQFM is the same as that described in step 501.

In step 902, the terminal reports the measured downlink SQFM, a transmission power of a random access information packet and an uplink initial bandwidth requirement to the base station.

In step 903, the base station determines a group of uplink sub-channels and transmission parameters related to the group of uplink sub-channels for the terminal based on the downlink SQFM, the transmission power of the random access information packet and the uplink initial bandwidth requirement.

In step 904, the base station transmits the group of uplink sub-channels and the related transmission parameters to the terminal.

In order to implement the above step 903, the base station may perform the following steps.

In step 9031, the base station measures an uplink average interference level.

In this step, after receiving signals from an uplink wireless channel, a Base Transceiver Station Receiver (BTS Receiver) firstly performs a fast Fourier transform on the signals received and performs signal extraction and signal detection on the transformed signals. Signals in an IOW are part of the signals to be extracted. Symbols generated through the signal detection are further used for decoding a message. When the base station adopts multiple antennas, the above signal extraction and signal detection can be performed on data received from all the antennas. Herein, a beam forming and zero-pole technique may be adopted. The signals extracted and the symbols detected will be used for calculating the uplink interference characteristics, e.g., an instantaneous interference level $CI_{ul}(k,t)$ of the k'th uplink sub-channel, an average interference level of the k'th downlink sub-channel $ACI_{ul}(k,t)$, an instantaneous interference level of the resource block at the j'th frequency band and the t'th frame $BI_{ul}(j,t)$ and an average interference level of the j'th frequency band up to the t'th frame $ABI_{ul}(j,t)$. The method for calculating the parameters are the same as that for calculating corresponding downlink parameters. The difference only lies in that, the data used for calculating the above statistic is from uplink.

In step 9032, after obtaining the uplink average interference level, the base station calculates a transmission power $BDPPC_{ul}(j,t)$ of each sub-channel in a RB for supporting a minimum modulation/coding scheme.

The $BDPPC_{ul}(j,t)$ counts in factors such as path loss, signal quality fluctuation and the interference of the k'th RB. Based on the $BDPPC_{ul}(j,t)$, transmission powers of various modulation/coding schemes can be obtained.

In this embodiment, for calculating the $BDPPC_{ul}(j,t)$, the base station will calculate a $SNR_{th}$ of a random access information packet received, and calculate the $BDPPC_{ul}(j,t)$ according to the following formula (10) based on the SQFMdl and Ptx obtained from the random access information packet:

$$BDPPC_{ul}(j,t)=SNR_{th}-P_{tx}-SNR-CI_{access}+ABI_{ul}(j,t)+SQFM_{dl} \quad (10)$$

Herein, $CI_{access}$ denotes the interference observed in the random access sub-channel, and $SNR_{th}$ denotes the SNR threshold required to support the minimum modulation/coding scheme.

In step 9033, the base station determine the group of uplink sub-channels and the transmission parameter related to the group of uplink sub-channels according to the uplink initial bandwidth requirement and the transmission power $BDPPC_{ul}(j,t)$ required for supporting the minimum modulation/coding scheme in each uplink sub-channel of the resource block.

Figure 10:
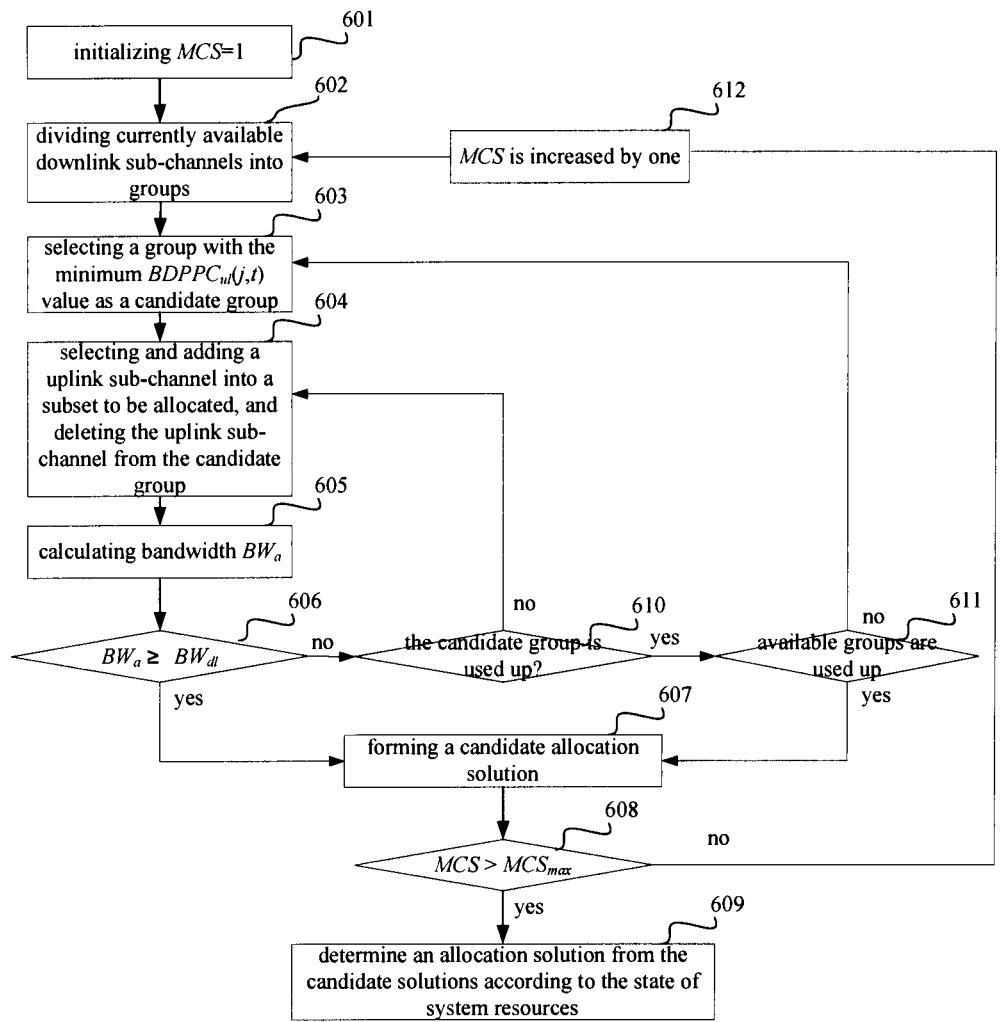
FIG. 10 is a flowchart illustrating a method for determining a group of uplink sub-channels and related transmission parameters according to an embodiment of the present invention.

In this embodiment, in an initial allocation of uplink radio resources, a subset will be selected from a set of currently available uplink sub-channels according to the relative interference strength of the uplink sub-channels. Specifically, the currently available downlink sub-channels are grouped such that the sub-channels of the same group belong to the same RB. When selecting a subset from the set of currently available uplink sub-channels, it is preferable to select the sub-channels with relatively small interferences in the same group, i.e. for each modulation/coding scheme, the uplink sub-channels will be selected according to the $BDPPC_{ul}(j,t)$ and the maximum transmission power $P_{max}$ of the terminal. In this case, the terminal is further required to report the maximum transmission power $P_{max}$, of the terminal to the base station. During each selection procedure, if at least one of the following conditions is met, the iterative process will be terminated and the selected sub-channels will be outputted: (1) the uplink bandwidth requirement is met; (2) all the sub-channels have been selected or $P_{max}=0$ while the uplink bandwidth requirement is not met. The detailed selection process is shown in FIG. 10, which mainly includes the following steps.

In step 1001, a modulation/coding scheme identifier MCS is configured for identifying various modulation/coding schemes, and the initial value of the MCS is set to be 1.

In step 1002, uplink sub-channels which are currently available are divided into groups to obtain at least one available group where uplink sub-channels in the same available group belong to the same resource block.

In step 1003, an available group with a minimum $BDPPC_{ul}$ (j,t) is selected from the available groups of all the uplink sub-channels to be a candidate group.

In step 1004, an uplink sub-channel is selected from the candidate group, is added to a subset to be allocated, and is deleted from the candidate group.

In step 1005, a bandwidth BWa is calculated according to a current modulation/coding scheme.

In step 1006, the BWa is compared with the uplink bandwidth requirement BWul, if the BWa is larger than or equal to BWul, step 1007 is performed; otherwise, step 1010 is performed.

In step 1007, a candidate allocation solution is formed for the current modulation/coding scheme, and step 1008 is performed.

In step 1008, it is determined whether the MCS is larger than a maximum modulation/coding scheme identifier, i.e. determining whether all the modulation/coding schemes have been traversed, if yes, step 1009 is performed; otherwise, step 1012 is performed.

In step 1009, an allocation solution is determined from the candidate allocation solutions based on a state of system resources, and the process is ended.

In step 1010, it is determined whether all the candidate groups have been traversed, i.e. determining whether the candidate groups are used up, if yes, step 1011 is performed; otherwise, step 1004 is performed.

In step 1011, it is determined whether all the available groups are traversed, i.e. determining whether the available groups are used up, if yes, step 1007 is performed; otherwise, step 1003 is performed.

In step 1012, the MCS is increased by one, and step 1002 is performed.

Through the above method shown in FIG. 10, the base station calculates a candidate allocation solution for each possible modulation/coding scheme. And after all candidate allocation solutions are calculated, the base station selects the candidate allocation solution which yields a maximum uplink data rate as a final solution.

The above describes the method for allocating radio resources during a random access procedure of a terminal. Hereinafter, a method for allocating radio resources after a terminal has successfully completed the random access and has entered a communication state will be described.

Figure 11:
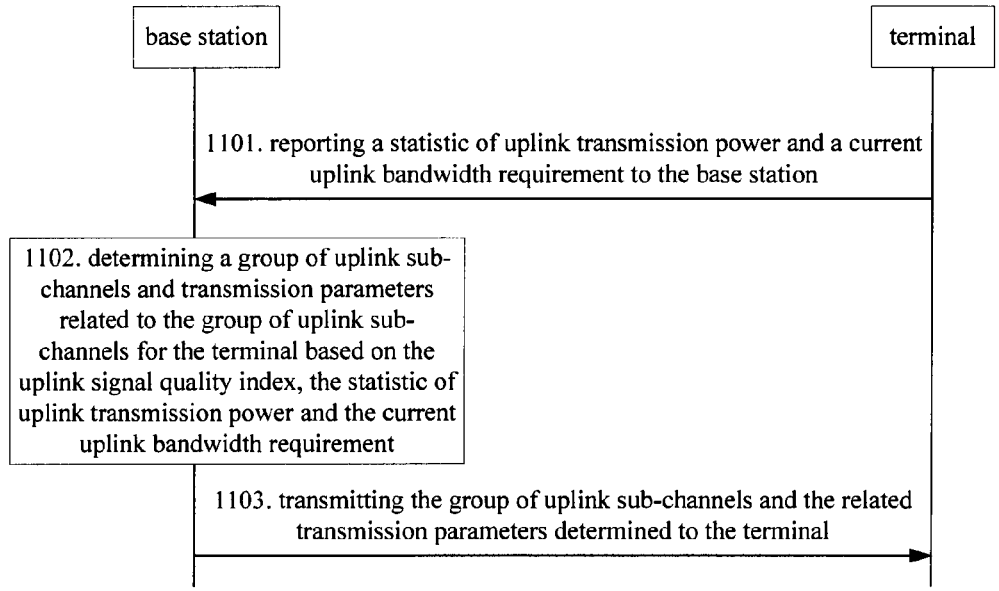
FIG. 11 is a flowchart illustrating a method for allocating uplink radio resources during a communication procedure of a terminal in the OFDMA-TDMA TDD system according to an embodiment of the present invention.

FIG. 11 is a flowchart illustrating a method for allocating uplink radio resources during a communication procedure of a terminal in the OFDMA-TDMA TDD system according to an embodiment of the present invention. In this embodiment, uplink transmission characteristics include a statistic of uplink transmission power. The uplink bandwidth requirement is a current uplink bandwidth requirement. As shown in FIG. 11, the method may include the steps as follows.

In step 1101, a terminal reports a statistic $BDPPC_{ul}(j,t^*)$ of uplink transmission power and a current uplink bandwidth requirement $BW_{req\_up}$ to a base station.

As described above, in the communication state, if uplink power control is adopted, the $BDPPC_{ul}(j,t)$ can be obtained by the terminal through calculating a moving average of the uplink transmission power.

In step 1102, the base station measures an uplink SQI, and determines a group of uplink sub-channels and transmission parameters related to the group of uplink sub-channels for the terminal based on the uplink SQI, the statistic $BDPPC_{ul}(j,t)$ of uplink transmission power and the current uplink bandwidth requirement $BW_{req\_up}$.

In step 1103, the base station transmits the group of uplink sub-channels and the related transmission parameter to the terminal.

Particularly, in the above step 1102, as for the uplink, suppose the uplink transmission power of the t'th frame in the j'th resource block at a given MCS is set to $BDP_{ul}(j,t)$. The $BDP_{ul}(j,t)$ may be further normalized to be $BDNP_{ul}(j,t)$ representing the transmission power for MCS=1. The $BDNP_{ul}(j,t)$ may be updated through a following formula (11):

$$BDPPC_{ul}(j,t)=\alpha \cdot BDPPC_{ul}(j,t-1)+(1-\alpha) \cdot BDNP_{ul}(j,t) \quad (11)$$

In order to trace channel changes, $BDNP_{ul}(j,t)$ is updated for each frame. However, in the communication state, the allocation of radio resources is not necessarily performed for every frame, and instead it may be performed once every T frames, wherein T>>1. Therefore, the $BDNP_{ul}(j,t)$ may be calibrated respectively according to statistics of the SQIs of downlink and uplink in T frames.

In an embodiment of the present invention, the SNRs of symbols detected in T frames are taken as the statistics of the SQIs, recorded as SNRstats. The value of the SNRstats should make P % of SNRs larger than the SNRstats, wherein the value of P % can be determined based on experience. That is, as to all j∈[t−T+1,t], the following two conditions should be met at the same time:

$$\text{for } j \epsilon S \subseteq [t-T+1,t], SNR(j,t) > SNR_{stats} \quad (1)$$

$$100 \cdot |S|/T = P. \quad (2)$$

Suppose a statistic $SNR_{stats\_ul}$ of the uplink SNR is obtained, and an uplink calibration item can be calculated according to the following formula (12):

$$D_{cal\_ul}=SNR_{th}(MCS)-SNR_{stats\_ul} \quad (12)$$

When allocating radio resources in the t'th frame, the $D_{cal\_ul}$ will be used for updating $BDPPC_{ul}(j,t)$, wherein the $BDPPC_{ul}(j,t)$ is updated according to the following formula (13):

$$BDPPC_{ul}(j,t_*)=BDPPC_{ul}(j,t_*)+D_{cal\_ul} \quad (13)$$

Once the $BDPPC_{ul}(j,t_*)$ is determined, in the communication state, the uplink radio resources may be allocated according to the method shown in FIG. 10.

For facilitating the calculation, channel information needs to be reported to the base station from the terminal. For example, the statistic of the uplink transmission power $BDPPC_{ul}(j,t^*)$, the downlink signal receiving quality $SNR_{stats\_ul}(j,t^*)$, and the current uplink bandwidth requirement $BW_{req\_up}(j,t^*)$ should be reported to the base station periodically. Once the calculation for new allocation is finished, the new channel allocation and corresponding parameters will be transmitted to the terminal to start a channel re-allocation procedure. The channels allocation and the corresponding parameter may include the locations of the allocated downlink/uplink sub-channels and corresponding modulation/coding schemes.

In the above embodiments, the OFDMA-TDMA TDD system is taken as an example. It should be noted that, the methods of the above embodiments may also be applied to other wireless communication systems, e.g. a CDMA-TDMA wireless communication system. In the CDMA-TDMA wireless communication system, each resource block includes multiple code channels and multiple symbol periods, and each sub-channel includes at least one code channel and multiple symbol periods in the same resource block of the code channel.

Figure 12:
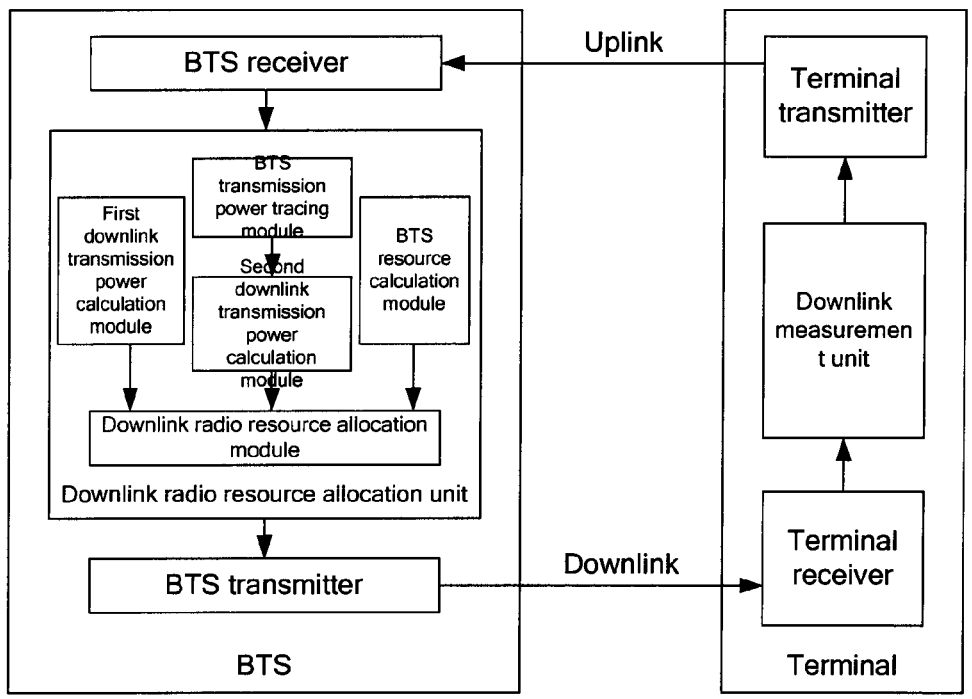
FIG. 12 is a schematic illustrating internal structures of a base station and a terminal for implementing a method for allocating downlink radio resources according to an embodiment of the present invention.

Besides the above methods for allocating radio resources, embodiments of the present invention also provide internal structures of a base station and a terminal for implementing the method for allocating downlink radio resources. As shown in FIG. 12, the base station may include:

a BTS receiver, adapted to receive RB dependent downlink channel characteristics and downlink interference characteristics reported by a terminal;

a downlink radio resource allocation unit, adapted to determine a group of downlink sub-channels and transmission parameters related to the group of downlink sub-channels for the terminal based on the RB dependent downlink channel characteristics, the downlink interference characteristics reported by the terminal and a downlink bandwidth requirement of the terminal; and a BTS transmitter, adapted to transmit the group of downlink sub-channels and the related transmission parameters to the terminal.

During a random access procedure of the terminal, the downlink radio resource allocation unit may include:

a first downlink transmission power calculation module, adapted to calculate a transmission power required by each downlink sub-channel of a resource block for supporting a minimum modulation/coding scheme based on an interference value observed in a random access sub-channel, a downlink signal quality fluctuation margin in a random access information packet, a RB dependent downlink average interference level and a transmission power of the random access information packet reported by the terminal;

a BTS resource calculation module, adapted to calculate a downlink initial bandwidth requirement based on an uplink initial bandwidth requirement and downlink packet arrivals destined to an accessing user; and a downlink radio resource allocation module, adapted to determine a group of downlink sub-channels and related transmission parameters based on the downlink initial bandwidth requirement, a state of system resources and the transmission power required by each downlink sub-channel of the resource block for supporting the minimum modulation/coding scheme.

In the communication procedure, the downlink radio resource allocation unit may include:

a BTS transmission power tracing module, adapted to calculate a transmission power required by each downlink sub-channel of the resource block for supporting a minimum modulation/coding scheme by calculating a moving average of the downlink transmission power with downlink power control;

a second downlink transmission power calculation module, adapted to calibrate the transmission power required by each downlink sub-channel for supporting the minimum modulation/coding scheme according to a downlink signal quality indicator received;

a BTS resource calculation module, adapted to determine the downlink bandwidth requirement; and a downlink radio resource allocation module, adapted to determine the group of downlink sub-channels and the related transmission parameter based on the downlink bandwidth requirement, the state of system resources and the transmission power required by each downlink sub-channel of the resource block for supporting the minimum modulation/coding scheme.

A terminal shown in FIG. 12 includes:

a downlink measurement unit, adapted to receive signals in at least one downlink sub-channels, and detect RB dependent downlink channel characteristics and downlink interference characteristics based on signals received;

a terminal transmitter, adapted to transmit the RB dependent downlink channel characteristics and the downlink interference characteristics detected to a base station; and a terminal receiver, adapted to receive from the base station a group of downlink sub-channels and related transmission parameters determined by the base station.

Figure 13:
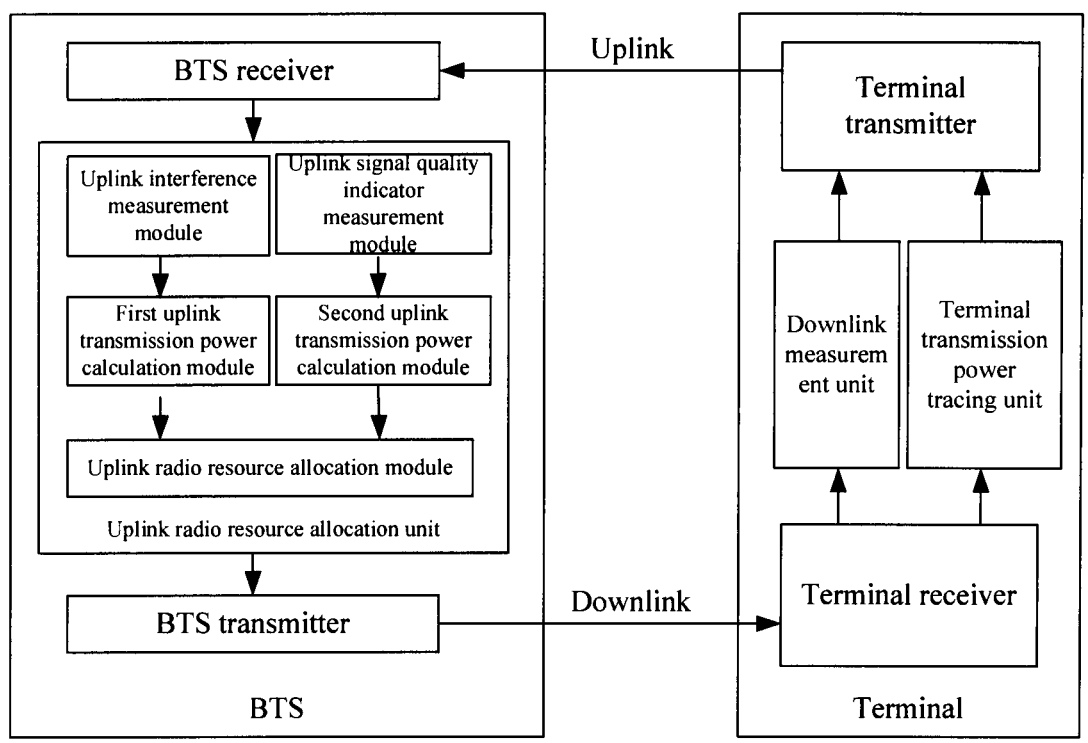
FIG. 13 is a schematic illustrating internal structures of a base station and a terminal for implementing a method for allocating uplink radio resources according to an embodiment of the present invention.

Embodiments of the present invention also provide internal structures of a base station and a terminal for implementing the method for allocating uplink radio resources. As shown in FIG. 13, the base station may include:

a BTS receiver, adapted to receive uplink transmission characteristics and uplink bandwidth requirement reported by a terminal;

an uplink radio resource allocation unit, adapted to determine a group of uplink sub-channels and transmission parameters related to the group of uplink sub-channels for the terminal based on the uplink transmission characteristics, an uplink bandwidth requirement reported by the terminal and RB dependent uplink channel characteristics; and a BTS transmitter, adapted to transmit the group of uplink sub-channels and the related transmission parameters to the terminal.

During a random access procedure of the terminal, the uplink radio resource allocation unit may include:

an uplink interference measurement module, adapted to measure an uplink average interference level;

a first uplink transmission power calculation module, adapted to calculate a transmission power required by each uplink sub-channel of a resource block for supporting a minimum modulation/coding scheme based on the uplink average interference level, an interference value observed in a random access sub-channel, a downlink signal quality fluctuation margin in a random access information packet and a transmission power of the random access information packet; and an uplink radio resource allocation module, adapted to determine a modulation/coding scheme and a corresponding group of uplink sub-channels based on a state of system resources.

During a communication procedure, the uplink radio resource allocation unit may include:

an uplink signal quality indicator measurement module, adapted to measure an uplink SQI;

a second uplink transmission power calculation module, adapted to calibrate the transmission power required by each uplink sub-channel for supporting the minimum modulation/coding scheme reported by the terminal according to the uplink SQI; and an uplink radio resource allocation module, adapted to determine a modulation/coding scheme and a corresponding group of uplink sub-channels according to the state of system resources.

As shown in FIG. 13, the terminal may include:

a terminal transmitter, adapted to transmit uplink transmission characteristics and an uplink bandwidth requirement to a base station;

a terminal receiver, adapted to receive a group of uplink sub-channels and transmission parameters related to the group of uplink sub-channels from the base station.

In order to implement allocation of radio resources during a random access procedure of the terminal, the above terminal may further include:

a downlink measurement unit, adapted to receive signals in at least one downlink sub-channel, and measure RB dependent downlink channel characteristics based on signals received; and the terminal transmitter is further adapted to transmit the RB dependent downlink channel characteristics to the base station.

In order to implement the allocation of uplink radio resources during a communication procedure, the above terminal may further include:

a terminal transmission power tracing unit, adapted to calculate a moving average of an uplink transmission power with uplink power control to calculate a transmission power required by each uplink sub-channel of the resource block for supporting a minimum modulation/coding scheme; and the terminal transmitter is further adapted to transmit the transmission power required by each uplink sub-channel for supporting the minimum modulation/coding scheme to the base station.

The foregoing descriptions are only preferred embodiments of this invention and are not for use in limiting the protection scope thereof. Any changes and modifications can be made by those skilled in the art without departing from the scope of this invention and therefore should be covered within the protection scope as set by the appended claims.

The invention claimed is:

1. A method for allocating radio resources, comprising:
   determining, by a base station, a group of downlink sub-channels and transmission parameters related to the group of downlink sub-channels for a terminal based on resource block (RB) dependent downlink channel characteristics and downlink interference characteristics and a downlink bandwidth requirement of the terminal reported by the terminal, and transmitting the determined group of downlink sub-channels and transmission parameters to the terminal;
   receiving, by the terminal, signals in at least one downlink sub-channels, and determining RB dependent downlink channel characteristics and the downlink interference characteristics based on the received signals;
   configuring at least one null symbol in the sub-channel as an interference observation window, wherein interference observation windows of adjacent base stations in the same sub-channel do not overlap with each other; and
   determining, by the terminal, the downlink interference characteristics through detecting data in the interference observation window of each sub-channel.

2. The method of claim 1, wherein the determining a group of downlink sub-channels and the transmission parameter related to the downlink sub-channels for the terminal comprises:
   A, for each modulation/coding scheme, selecting a group of available downlink sub-channels from at least one downlink resource block until a downlink bandwidth requirement of the terminal is met or all available sub-channels are used up, and calculating a transmission power required by each downlink sub-channel in all resource blocks;
   B, determining a modulation/coding scheme and a corresponding group of downlink sub-channels according to a state of system resources.

3. The method of claim 2, wherein during a random access procedure of the terminal, the downlink channel characteristics comprise a downlink signal quality fluctuation margin; and the downlink interference characteristics comprise a downlink average interference level.

4. The method of claim 3, wherein the step A comprises:
   determining a transmission power required by each downlink sub-channel of a resource block for supporting a minimum modulation/coding scheme based on an interference value observed in a random access sub-channel, the downlink signal quality fluctuation margin in a random access information packet, the RB dependent downlink average interference level and a transmission power of the random access information packet reported by the terminal.

5. The method of claim 3, wherein
   the step A comprises: calculating a downlink initial bandwidth requirement based on an uplink initial bandwidth requirement reported by the terminal and downlink packet arrivals destined to an accessing user; and
   the step B comprises: determining the group of downlink sub-channels and the transmission parameters related to the group of downlink sub-channels according to the downlink initial bandwidth requirement, the state of system resources and the transmission power of each downlink sub-channel of the resource block for supporting the minimum modulation/coding scheme.

6. The method of claim 2, wherein during a communication procedure, the downlink channel characteristics comprise a downlink signal quality indicator; and the downlink interference characteristics comprise a downlink average interference level.

7. The method of claim 6, wherein the step A comprises:
   calculating a moving average of a downlink transmission power with downlink power control to obtain a transmission power of each downlink sub-channel of the resource block for supporting the minimum modulation/coding scheme; and
   calibrating the transmission power of each downlink sub-channel for supporting the minimum modulation/coding scheme according to the downlink signal quality indicator received.

8. The method of claim 6, wherein the step B comprises:
   determining the group of downlink sub-channels and the transmission parameters related to the downlink sub-channels based on the downlink bandwidth requirement, the state of system resources and the transmission power of each downlink sub-channel of the resource block for supporting the minimum modulation/coding scheme.

9. The method of claim 6, wherein the downlink interference characteristics are obtained by calculating an average value of interference powers of all downlink sub-channels in the same resource block or by calculating an average value of interference powers of downlink sub-channels allocated to the terminal in the same resource block.

10. A method for allocating radio resources, comprising:
    determining, by a base station, a group of uplink sub-channels and transmission parameters related to the group of uplink sub-channels for a terminal based on uplink transmission characteristics, an uplink bandwidth requirement reported by the terminal and resource block (RB) dependent up channel characteristics, and transmitting the group of uplink sub-channels and the related transmission parameters to the terminal;
    wherein the determining a group of uplink sub-channels and the transmission parameter related to the group of uplink sub-channels for the terminal comprises:
    a, for each modulation/coding scheme, selecting a group of available uplink sub-channels from at least one uplink resource block until the uplink bandwidth requirement is met or all available sub-channels are used up, and calculating a transmission power required by each sub-channel in all resource blocks;

b, determining a modulation/coding scheme and a corresponding group of uplink sub-channels according to a state of system resources.

11. The method of claim 10, wherein during a random access procedure of the terminal, the uplink transmission characteristics comprise a transmission power of a random access information packet; and the uplink bandwidth requirement comprises an uplink initial bandwidth requirement; and the uplink channel characteristics comprise a downlink signal quality fluctuation margin.

12. The method of claim 11, wherein the step a comprises:
measuring an uplink average interference level; and
calculating a transmission power required by each uplink sub-channel of a resource block for supporting a minimum modulation/coding scheme based on the uplink average interference level, an interference value observed in a random access sub-channel, the downlink signal quality fluctuation margin reported by the terminal and the transmission power of the random access information packet.

13. The method of claim 10, wherein during a communication procedure, the uplink transmission characteristics comprise a statistic of uplink transmission power with uplink power control; the uplink bandwidth requirement comprises a current uplink bandwidth requirement; and the uplink channel characteristics comprise an uplink signal quality indicator.

14. The method of claim 13, wherein the step a comprises:
calculating, by the terminal, a moving average of the uplink transmission power with uplink power control to obtain the transmission power required by each uplink sub-channel of the resource block for supporting the minimum modulation/coding scheme, and transmitting the transmission power obtained to the base station; and
measuring, by the base station, the uplink signal quality indicator, and calibrating the transmission power required by each uplink sub-channel for supporting the minimum modulation/coding scheme according to the uplink signal quality indicator.

15. A base station, comprising:
a base station receiver, adapted to receive resource block (RB) dependent downlink channel characteristics and downlink interference characteristics reported by a terminal;
a downlink radio resource allocation unit, adapted to determine a group of downlink sub-channels and transmission parameters related to the group of downlink sub-channels for the terminal based on the RB dependent downlink channel characteristics, the downlink interference characteristics reported by the terminal and a downlink bandwidth requirement of the terminal; and
a base station transmitter, adapted to transmit the determined group of downlink sub-channels and related transmission parameters to the terminal;
wherein the downlink radio resource allocation unit comprises:
a first downlink transmission power calculation module, adapted to calculate a transmission power required by each downlink sub-channel of a resource block for supporting a minimum modulation/coding scheme based on an interference value observed in a random access sub-channel, a downlink signal quality fluctuation margin in a random access information packet, the RB dependent downlink average interference level and the transmission power of the random access information packet reported by the terminal;
a base station resource calculation module, adapted to calculate a downlink initial bandwidth requirement based on the uplink initial bandwidth requirement and downlink packet arrivals destined to an accessing user; and
a downlink radio resource allocation module, adapted to determine the group of downlink sub-channels and the related transmission parameters based on the downlink initial bandwidth requirement, a state of system resources, and the transmission power required by each downlink sub-channel of the resource block for supporting the minimum modulation/coding scheme.

16. A base station, comprising:
a base station receiver, adapted to receive resource block (RB) dependent downlink channel characteristics and downlink interference characteristics reported by a terminal;
a downlink radio resource allocation unit, adapted to determine group of downlink sub-channels and transmission parameters related to the group of downlink sub-channels for the terminal based on the RB dependent downlink channel characteristics, the downlink interference characteristics reported by the terminal and a downlink bandwidth requirement of the terminal; and
a base station transmitter adapted to transmit the determined group of downlink sub-channels and related transmission parameters to the terminal;
wherein the downlink radio resource allocation unit comprises:
a base station transmission power tracing module, adapted to calculate a moving average of a downlink transmission power with downlink power control to obtain the transmission power required by each downlink sub-channel for supporting the minimum modulation/coding scheme;
a second downlink transmission power calculation module, adapted to calibrate the transmission power required by each downlink sub-channel for supporting the minimum modulation/coding scheme according to a downlink signal indicator received;
a base station resource calculation module, adapted to determine a downlink bandwidth requirement; and
a downlink radio resource allocation module, adapted to determine the group of downlink sub-channels and the related transmission parameters based on the downlink bandwidth requirement, the state of system resources and the transmission power required by each sub-channel of the resource block for supporting the minimum modulation/coding scheme.

17. A base station, comprising:
a base station receiver, adapted to receive uplink transmission characteristics and an uplink bandwidth requirement reported by a terminal;
an uplink radio resource allocation unit, adapted to determine a group of uplink sub-channels and transmission parameters related to the group of uplink sub-channels for the terminal based on the uplink transmission characteristics, the uplink bandwidth requirement reported by the terminal and the RB dependent uplink channel characteristics; and
a base station transmitter, adapted to transmit the determined group of uplink sub-channels and related transmission parameters to the terminal;

wherein the uplink radio resource allocation unit comprises:

an uplink interference measurement module, adapted to measure an uplink average interference level;

a first uplink transmission power calculation module, adapted to calculate a transmission power required by each uplink sub-channel of the resource block for supporting a minimum modulation/coding scheme based on the uplink average interference level, an interference value observed in a random access sub-channel, the downlink signal quality fluctuation margin reported by the terminal and a transmission power of the random access information packet; and an uplink radio resource allocation module, adapted to determine a modulation/coding scheme and a corresponding group of uplink sub-channels based on a state of system resources.

18. A terminal, comprising:

a terminal transmitter, adapted to transmit uplink transmission characteristics and an uplink bandwidth requirement to a base station;

a terminal receiver, adapted to receive from the base a group of uplink sub-channels and transmission parameters related to the group of uplink sub-channels determined by the base station;

a terminal transmission power tracing unit, adapted to calculate a moving average of an uplink transmission power with uplink power control to obtain a transmission power required by each uplink sub-channel of a resource block for supporting a minimum modulation/coding scheme; and the terminal transmitter is further adapted to transmit the transmission power required by each uplink sub-channel for supporting the minimum modulation/coding scheme to the base station.

19. The terminal of claim 18, further comprising:

a downlink measurement unit, adapted to receive signals in at least one downlink sub-channels, and determine RB dependent downlink channel characteristics based on the signals received; and the terminal transmitter is further adapted to transmit the RB dependent downlink channel characteristics to the base station.

\* \* \* \* \*